US008817611B2

(12) United States Patent
Kleineberg et al.

(10) Patent No.: US 8,817,611 B2
(45) Date of Patent: Aug. 26, 2014

(54) PARALLEL OPERATION OF RSTP (RAPID SPANNING TREE PROTOCOL) AND MRP (MEDIA REDUNDANCY PROTOCOL) AND SEGMENTATION/COUPLING

(75) Inventors: Oliver Kleineberg, Wendlingen (DE); Dirk Mohl, Esslingen (DE); Henri Mueller, Reutlingen (DE)

(73) Assignee: Hirschmann Automation and Control GmbH, Neckartenzlingen (DE)

( * ) Notice: Subject to any disclaimer, the term of this patent is extended or adjusted under 35 U.S.C. 154(b) by 0 days.

(21) Appl. No.: 13/203,723

(22) PCT Filed: Mar. 18, 2010

(86) PCT No.: PCT/EP2010/001702
§ 371 (c)(1),
(2), (4) Date: Aug. 27, 2011

(87) PCT Pub. No.: WO2010/105828
PCT Pub. Date: Sep. 23, 2010

(65) Prior Publication Data
US 2011/0317555 A1 Dec. 29, 2011

(30) Foreign Application Priority Data
Mar. 18, 2009 (DE) .......................... 10 2009 013 416

(51) Int. Cl.
*G01R 31/08* (2006.01)
*H04L 12/40* (2006.01)
*H04L 12/437* (2006.01)

(52) U.S. Cl.
CPC ................... *H04L 12/437* (2013.01); *H04L 12/40176* (2013.01)
USPC .................... 370/230; 370/218; 370/224

(58) Field of Classification Search
None
See application file for complete search history.

(56) References Cited

U.S. PATENT DOCUMENTS 6,430,151 B1   8/2002 Glas
6,928,050 B2 * 8/2005 Lynch et al. ................ 370/224
(Continued)

FOREIGN PATENT DOCUMENTS

DE    10354712 A    6/2005
WO    2008037781 A  4/2008

OTHER PUBLICATIONS

IEEE Computer Society, "802.1D Media Access Control (Mac) Bridges" Jun. 9, 2004, pp. 1-180.

*Primary Examiner* — Robert Wilson
(74) *Attorney, Agent, or Firm* — Andrew Wilford

(57) ABSTRACT

The invention relates to a method for running a network, in particular an Ethernet network with redundancy properties, wherein the network has a ring network topology, in which network devices are connected to each other with the data ports thereof via data lines and exchange control data and user data by means of protocols via the data lines, wherein the protocols prevent the transmission of network traffic via certain data ports of individual network devices with the exception of network traffic for controlling and/or monitoring the media redundancy, in order to avoid an endless circulation of network traffic in physical loops of the network, wherein it is provided according to the invention that at least two different protocols are executed parallel to each other in the network on the network devices, wherein the parallel operation of the at least two redundancy protocols is enabled by the fact that the control over the data ports to be blocked is assigned to an individual redundancy, or the parameters for the at least two redundancy protocols are chosen and/or the work processes of the redundancy protocols are arranged that one redundancy protocol does not block connections which the other redundancy protocol regards as active.

2 Claims, 6 Drawing Sheets

(56) References Cited

U.S. PATENT DOCUMENTS

| | | |
|---|---|---|
| 7,385,919 B2 | 6/2008 | Koestner |
| 8,036,106 B1 * | 10/2011 | Hu et al. .................. 370/218 |
| 8,344,736 B2 * | 1/2013 | Wimmer .................. 324/555 |
| 2011/0317555 A1 * | 12/2011 | Kleineberg et al. ......... 370/230 |

* cited by examiner

US 8,817,611 B2

PARALLEL OPERATION OF RSTP (RAPID SPANNING TREE PROTOCOL) AND MRP (MEDIA REDUNDANCY PROTOCOL) AND SEGMENTATION/COUPLING

CROSS REFERENCE TO RELATED APPLICATIONS

This application is the US-national stage of PCT application PCT/EP2010/001702 filed 18 Mar. 2010, published 23 Sep. 2010 as WO2010/105828, and claiming the priority of German patent application 102009013416.6 itself filed 18 Mar. 2009.

FIELD OF THE INVENTION

The invention relates to a method of operating a network, in particular an Ethernet network with redundancy properties, the network in particular having a ring network topology in which network devices are connected to one another with their data ports via data lines and exchange control data and user data via the data lines with the aid of protocols that suppress the exchange of network traffic via certain data ports of individual network devices with the exception of network traffic for controlling and/or monitoring the media redundancy in order to avoid an endless recirculation of network traffic in physical loops of the network.

BACKGROUND OF THE INVENTION

Figure 1:
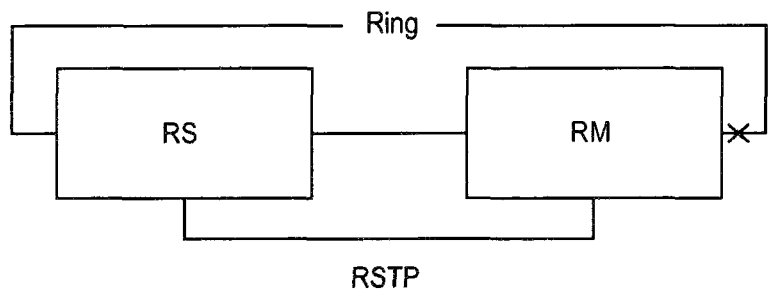
FIGS. 1 and 2 are block diagrams illustrating the prior art.

This is thus in particular an invention for Ethernet switches in networks. Furthermore, the invention relates in particular to switches in networks with special environmental conditions. However, the invention does not need to be limited to the use with switches, but it is preferably applicable here. The use of the invention with switches is therefore dealt with below, although it can be used in general with the electronic devices cited above that are connected to a network with at least two network accesses (data ports).

The prior-art protocols used today in the field of Ethernet networks render possible a media redundancy, although the technology on which the network transmission is based, the Ethernet, due to the broadcast characteristics (broadcast topology), is not normally able to work with network circuits (ring topology).

RSTP and MRP protocols are known. RSTP is specified in "IEEE 802.1D-2004:802.1D IEEE Standard for local and metropolitan area networks," MRP is specified in "Draft IEC 62439-2 Industrial Communications Networks High Availability Automation Networks; Part 2: Media Redundancy Protocol (MRP)," the general mechanism for operating a ring-redundancy protocol on an Ethernet basis is known from WO99/046908 (Local Network, in particular Ethernet network, with redundancy characteristics and redundancy manager) [U.S. Pat. No. 6,430,151].

The MRP protocol is used below by way of example for Ethernet ring-redundancy protocols. The methods are likewise valid for other ring-redundancy protocols, such as, for example, the Fast HiPER ring from Hirschmann or the like.

The RSTP protocol breaks loops in the network topology by administratively blocking individual connection points (for example network ports at which network devices are connected) between the network devices (also referred to as network infrastructure devices, such as, for example, Ethernet switches, routers and the like) and breaking the loop topology into a tree with the highest prioritized network device as a root (root bridge).

In the supported network topologies (in contrast to RSTP) the MRP protocol is limited to a pure ring structure and therefore, in contrast to RSTP, can operate with a method optimized with respect to the determinism of the reconfiguration time.

Both protocols have in common that they suppress the is exchange of network traffic via certain ports (also referred to as data ports) of individual network devices with the exception of network traffic for controlling/monitoring the media redundancy in order to avoid an endless recirculation of network traffic, so called loops and/or broadcast storms, in physical loops.

However, to this end a protocol needs exclusive access to resources of a network infrastructure device, namely the network port administration thereof in order to be able to activate and deactivate these ports for normal network traffic as needed.

However, there are no interfaces between the two protocols, which is why both protocols can operate only completely independently of one another. It has not been hitherto ensured that both protocols cooperate without any problems with a common operation of both protocols in a common network. For MRP it is compulsorily required that RSTP must be switched off at the network ports at which MRP is operating in order to avoid problems. It has hitherto been impossible for one and the same RSTP network to be connected at more than one switch in the MRP ring.

Due to this restriction, in the event of an incorrect cabling, loops can occur as shown in FIG. 1. The RSTP connection present in addition to the "ring" structure between the two infrastructure devices RS and RM represented symbolically is not blocked by the RSTP and the loop is not broken, since the protocol cannot detect the loop because it is not activated at the ports at which the MRP ring protocol is operating.

Furthermore, there is the danger of ports being administratively blocked by a redundancy protocol, while other protocols want to switch via this port.

Figure 2:
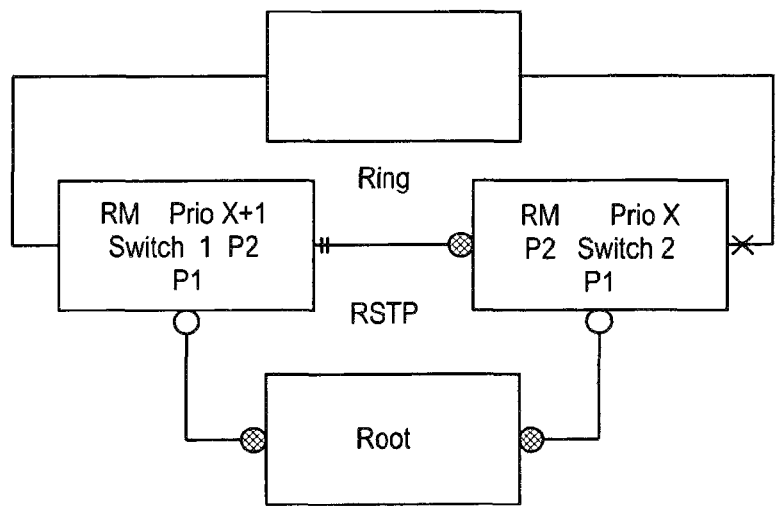

FIG. 2 shows the RSTP root bridge with two switches connected in the ring. The path costs from the RS and RM switches directly to the root bridge are smaller than any other connection to the root bridge. The RSTP thus breaks the loop that has formed by blocking the connection between RS and RM. However, the ring-redundancy protocol configured inside the ring has, independently of this, already automatically blocked another ring port in order to break the loop that the ring represents.

OBJECT OF THE INVENTION

The object of the invention is therefore to make possible stable, parallel operation of RSTP with ring-redundancy protocols without undesirable side effects such as loops or undesirable blockages occurring that prevent the proper operation of the network, as well to make possible a reaction-free coupling of several redundancy protocols inside a physical network structure.

Another object is to ensure that switching processes in one part of the network have an effect only on the part of this network concerned and do not have an effect on the entire network, to be more exact on further connected networks, and there cause unnecessary interruptions for this region.

SUMMARY OF THE INVENTION

Figure 9:
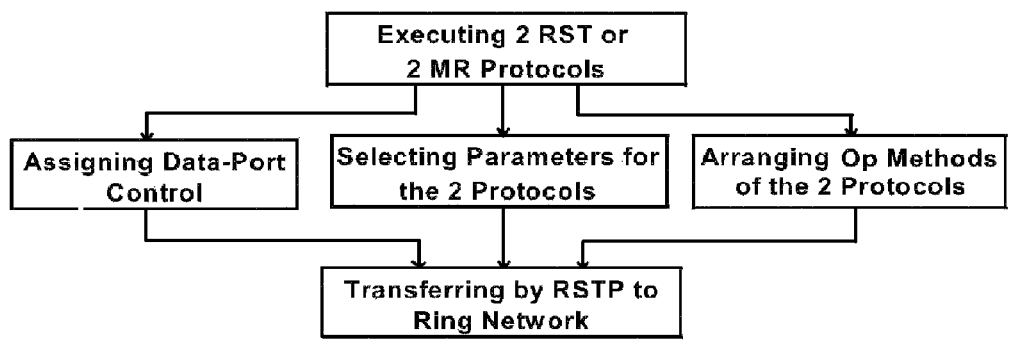

According to the invention as shown in FIG. 9, at least two different protocols are executed parallel to one another in the network on the network devices, the parallel operation of the at least two redundancy protocols being thereby made possible in that control over the data ports to be blocked is either assigned to an is individual redundancy protocol or the parameters for the at least two redundancy protocols are selected such and/or the operating methods of the redundancy protocols are arranged such that the one redundancy protocol does not block connections that the other redundancy protocol regards as active.

The method explained thus describes the parallel operation of two protocols for realizing media redundancy in Ethernet networks with one and the same network topology, as well as a possible segmentation and coupling by means of two protocols, at least one of them always being an RSTP protocol or a protocol related thereto.

The advantage of the solution is that an RSTP topology can be connected via several connections instead of by only one connection as in the past, so that redundancy in the coupling of (redundant) networks is thereby achieved.

The solution according to the invention describes three methods for how a ring-redundancy protocol and the Rapid Spanning Tree Protocol can be used via the establishment of additional parameters such that a loop-free parallel operation of both protocols is possible, as well as a method of how two RSTP networks can be coupled such that they do not influence one another unnecessarily in the event of a reconfiguration.

The parallel operation of several redundancy protocols is made possible in that the control of the ports to be blocked is either assigned to an individual protocol or the parameters for both protocols are selected such that and/or the operating methods of the protocols are adjusted such that no connections are blocked is by a protocol that the other protocol regards as active. Thus all of the risks produced by the parallel operation of losing the switching ability due to data frames circulating in the network, are minimized. Coupling between networks with redundancy protocols is thereby realized in that for a protocol fixed parameters are defined at the coupling interfaces, which parameters guarantee the error-free operation in a respective network or network segment.

Ring-Redundancy Protocol and RSTP:

The MRP protocol is given below as an example of an Ethernet ring-redundancy protocol. However, the method is not restricted to the application with MRP, but can be applied to all ring-redundancy protocols that follow a similar or identical operating plan.

Parallel Operation of MRP and RSTP with Priority for MRP:

The idea is that the RSTP protocol transfers its control packets completely via the ring, but the ring is always presented as a line for RSTP.

This is achieved by the RSTP protocol being restricted at the ring ports. On the one hand the RSTP protocol cannot change the port states (blocking, forwarding), on the other hand the ring protocol prevents the RSTP traffic completely on the ring port blocked by the ring protocol on the redundancy manager.

The ring-redundancy protocol hereby has complete control over the ring ports, while RSTP has no control. The prevention of the blocking of the ring ports by the RSTP protocol is achieved by the mechanism that the data frames that the RSTP sends for information, the so-called BPDUs (bridge protocol data units), are not forwarded via the blocked ring port. This connection is thus invisible for the RSTP and can no longer be blocked or considered to be transmissible for higher protocol traffic.

Since the RSTP as described must not have any control over the ring ports, it must be ensured that a connected RSTP network can never cause a ring port to have to be blocked with respect to the RSTP loop breakage. This is ensured by all of the switches contained in the ring always being configured with a higher priority than all of the switches connected to the ring, and by all of the ring connections having the best path costs in the network, which corresponds to the value 0. Freedom from loops is achieved in that "non" ring ports are never assigned a different role than "designated" by RSTP.

The advantage of this method is that the RSTP runs over the entire network, but the reconfiguration in the MRP ring runs at the speed of MRP and is not dependent on RSTP.

SPECIFIC DESCRIPTION OF THE INVENTION

Coupling of MRP and RSTP with Freedom from Reactions Between the Protocols:

With this solution, the MRP ring is understood to be the backbone. The special feature of this method is that a switch-over in the backbone does not cause a switch-over in the connected RSTP structures. Furthermore, the RSTP restriction regarding extension no longer applies to the backbone.

With this solution, an unrestricted RSTP operation is now possible at all of the switches of the ring, so that an RSTP network can also be connected to more than one ring switch. Topology changes are thereby forwarded to the ring network as needed. The switch-over speed of the ring is thereby completely independent of RSTP and is determined exclusively by the ring-redundancy protocol.

The RSTP remains switched off at the ports of the infrastructure devices inside the MRP ring at which a ring-redundancy protocol is configured. RSTP is activated for all of the ports at infrastructure devices of the MRP ring that are not ring ports. At the same time, one and the same parameter set for the cost and priority values of a "virtual root bridge," in FIG. 3 (Error! reference source not found) also referred to as "VRoot," is configured via all of the infrastructure devices of the ring. This also includes an identical bridge ID of the VRoot. The path costs to this root bridge are always forwarded to the ring switches with identical values. The priority of this VRoot must be better than the priority of all of the devices present in the connected RSTP networks. For an RSTP network outside the MRP ring, therefore, each port of each infrastructure device is presented as a port at an "optimal" root bridge. in this respect, see also the diagrammatic representation of a device of this type in FIG. 4.

Figure 3:
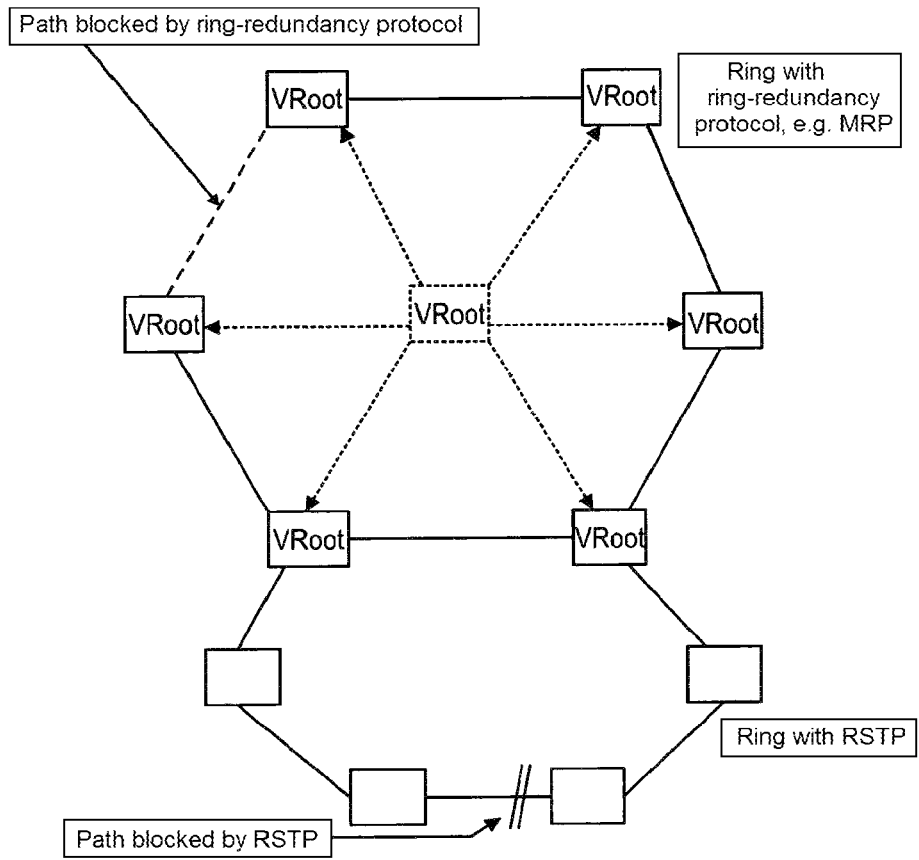
FIGS. 3-9 are block diagrams illustrating the instant invention.
Figure 4:
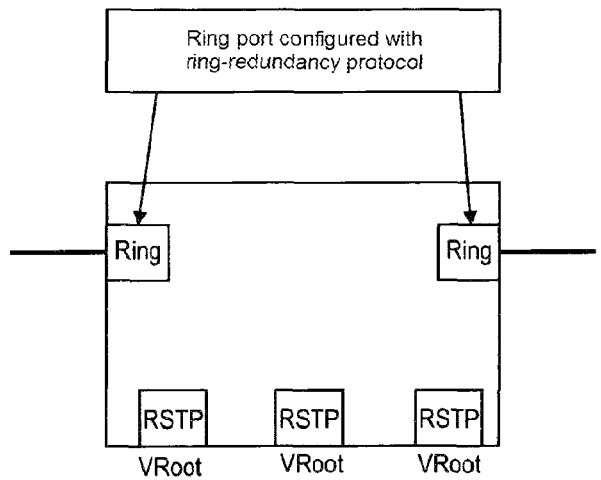
Figure 5:
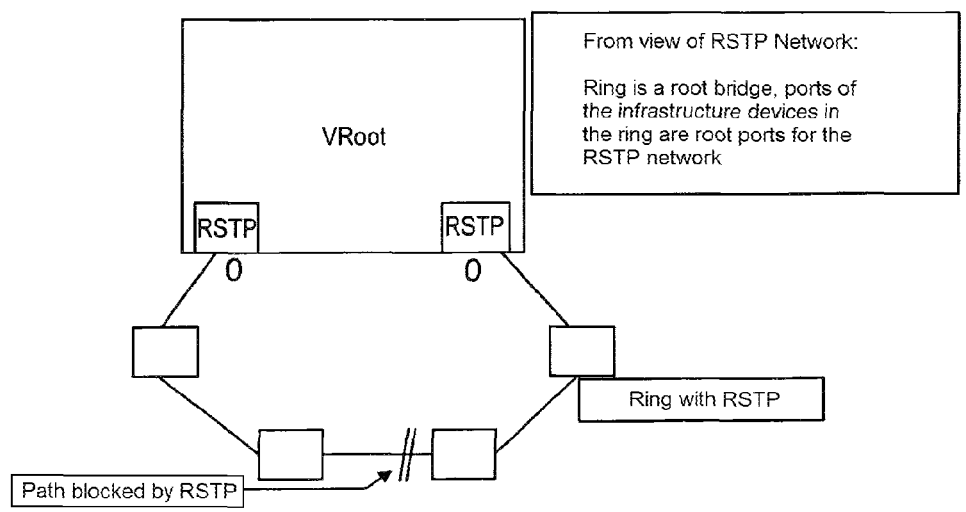

FIG. 5 shows the network shown in FIG. 3 from the point of view of the RSTP network: The MRP ring is for the RSTP network structurally a large, cohesive root bridge.

Figure 6:
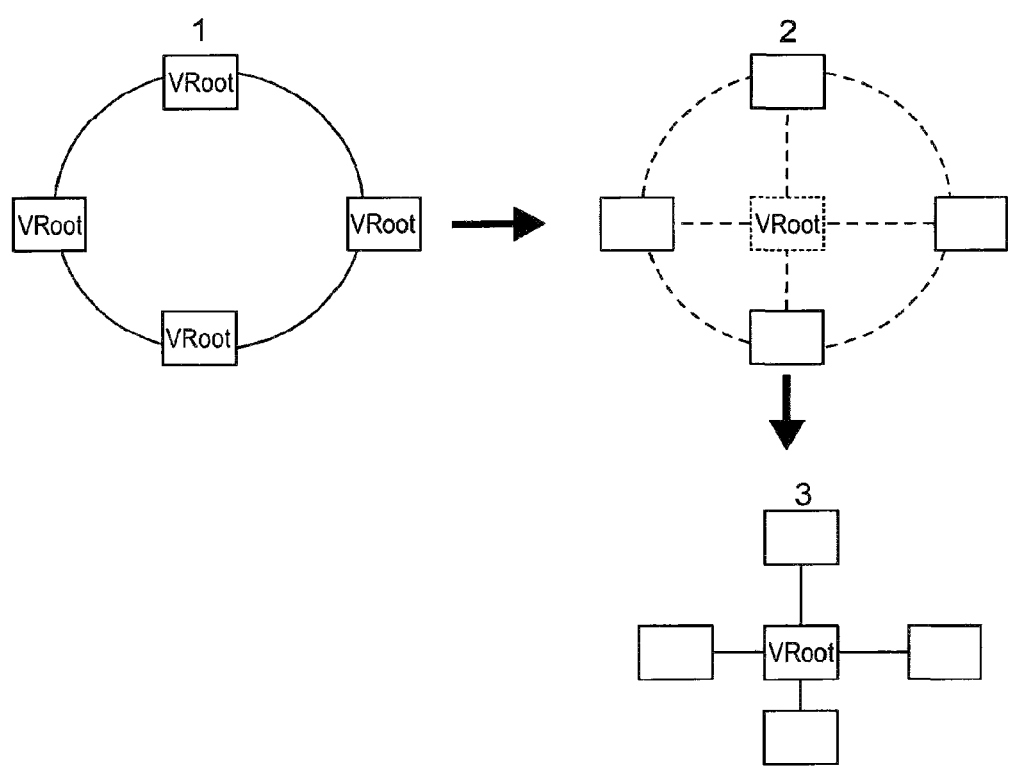

FIG. 6 shows diagrammatically in four steps the transition from the ring structure with the virtual root bridge that is applied to the ring devices (step 1) to the virtual root bridge with which all of the elements of the ring are directly connected (step 3) and appears outwardly to the RSTP as a root bridge. An RSTP network structure connected to the MRP ring is thus configured free from loops.

It should be noted that this method ensures that there is no RSTP bridge with a better priority outside the backbone. This also means that there is always only one backbone in connected networks.

Figure 7:
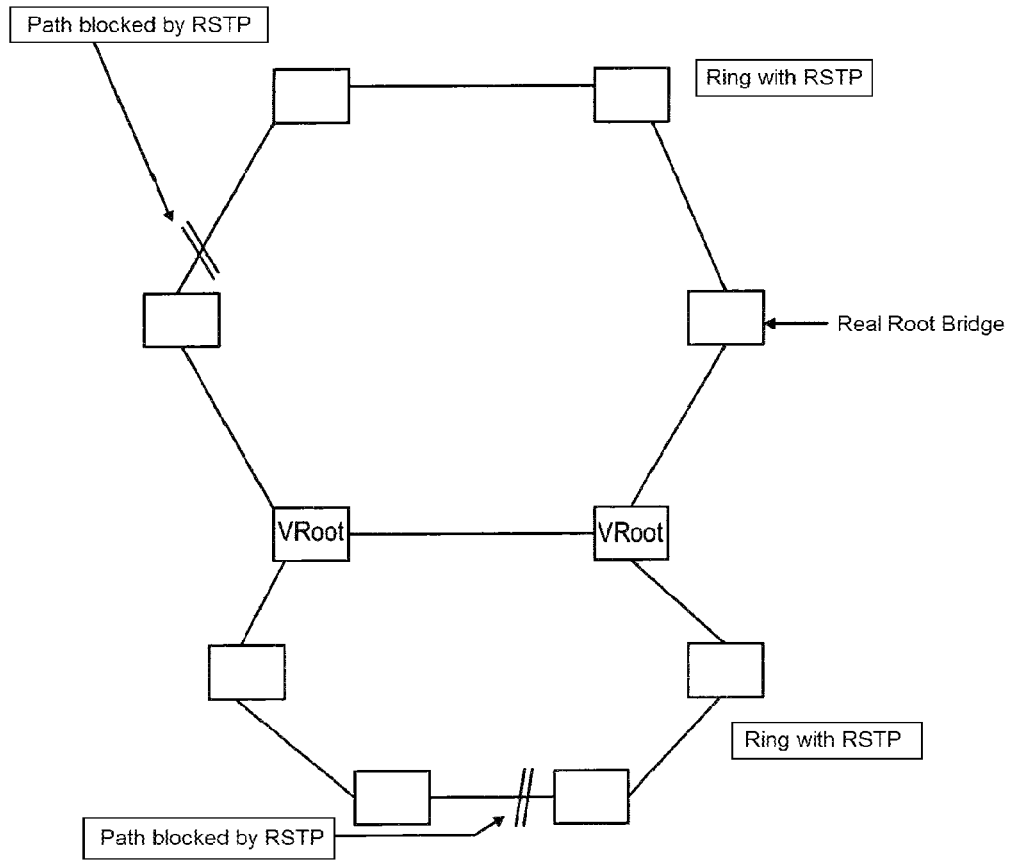

Instead of a ring-redundancy protocol, the physical ring structure, labeled in FIG. 3 "ring with ring-redundancy protocol," can also be configured with a different redundancy protocol, such as, for example, likewise the RSTP (see also FIG. 7 in this context).

The object is now not to let a reconfiguration possibly taking place in one of the two rings shown here have a reaction on the other ring that would be possible in the case of an RSTP tree operating jointly and spanned by a root bridge.

Figure 8:
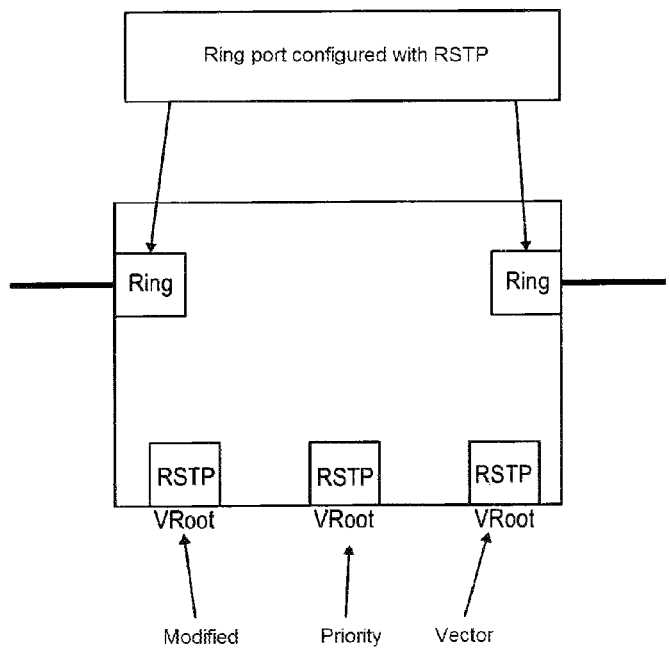

This is achieved by the RSTP protocol being activated on the ring ports on one device of a ring in which the real RSTP root bridge is located. The transmitted spanning tree priority vector is influenced by configuration at all of the ports that are not ring ports, and this, just as with the VRoot explained above, is is configured such (no lower costs, no better priority in the connected network than in the backbone) that connected networks, such as, for example, the lower ring structure in FIG. 7, accept these ports as direct ports to an optimal root bridge (see also FIG. 8). The underlying network structure is broken down in a loop-free manner and configuration changes (for example due to hardware failure) in this network structure are uncoupled from other network structures, for example, the upper ring structure. Likewise, in this case topology changes are forwarded as needed.

The invention claimed is:

1. A method of operating an Ethernet network with redundancy properties and having a ring network topology in which network devices are connected to one another with their data ports via data lines and for exchange of control data and user data via the data lines with the aid of protocols that suppress the exchange of network traffic via certain data ports of individual network devices with the exception of network traffic for controlling or monitoring medium redundancy in order to avoid an endless recirculation of network traffic in physical loops of the Ethernet Network, the method comprising the steps of:

executing at least two different redundancy protocols that are Rapid Spanning Tree and Media Redundancy protocols in parallel by the network devices in the Ethernet network;

determining and assigning control to one of the two different redundancy protocols to have total control over which ports in the network devices are active and which ports are blocked for transmission of user data and network data network traffic that results in a line of network devices while allowing all control and monitor traffic to traverse the ring of network devices;

transmitting control and monitoring packets by the Rapid Spanning Tree protocol packets through all of the network devices in the ring while restricting the data ports of the network devices to transmit user data and data network traffic to the network devices connected in the line of the network devices.

2. A method of operating an Ethernet network with redundancy properties and having a ring network topology in which network devices are connected to one another with their data ports via data lines and for exchange of control data and user data via the data lines with the aid of protocols that suppress the exchange of network traffic via certain data ports of individual network device with the exception of network traffic for controlling or monitoring medium redundancy in order to avoid an endless recirculation of network traffic in physical loops of the ethernet network, the method comprising the steps of:

executing at least two different redundancy protocols that are Rapid Spanning Tree and Media Redundancy protocols in parallel by the network devices in the Ethernet network;

determining and assigning control to one of the two different redundancy protocols to have total control over which ports in the network devices are active and which ports are blocked for transmission of user data and network data network traffic that results in a line of network devices while allowing all control and monitor traffic to traverse the ring of network devices;

transmitting control and monitoring packets by the Rapid Spanning Tree protocol packets through all of the network devices in the ring while restricting the data ports of the network devices to transmit user data and data network traffic to the network devices connected in the line of the network devices;

collecting parameters received in Rapid Spanning Tree protocol packets from all of the network devices in the ring in order to determine which network device of the network devices is a virtual root bridge.

* * * * *